United States Patent [19]
Colovas et al.

[11] 3,768,829
[45] Oct. 30, 1973

[54] VEHICLE SUSPENSION
[75] Inventors: Denny D. Colovas; John S. Logan; Richard R. Skruch, all of Dearborn, Mich.
[73] Assignee: Ford Motor Company, Dearborn, Mich.
[22] Filed: Sept. 25, 1972
[21] Appl. No.: 293,306

[52] U.S. Cl.......... 280/124 R, 180/24.01, 280/81 A, 267/66
[51] Int. Cl............................................. B60g 11/16
[58] Field of Search...................... 280/124 R, 81 A; 267/66; 180/24.01

[56] References Cited
UNITED STATES PATENTS
2,998,265  8/1961  Kozicki .......................... 180/73 R X
3,174,771  3/1965  Muller............................. 280/124 R Primary Examiner—Philip Goodman
Attorney—Keith L. Zerschling et al.

[57] ABSTRACT

A vehicle suspension system for a "wagon steer" axle is comprised of a four-bar linkage including upper and lower links connected to ball joints above and below the center of the axle to establish an axis for steering. Both ends of the lower link are capable of limited universal movement to permit rocking of the axle relative to the frame. A pair of coil springs extend upwardly from the axle to the frame and are capable of lateral deflection to permit steering of the axle.

4 Claims, 3 Drawing Figures

VEHICLE SUSPENSION

This invention relates to vehicle suspension systems of the wagon-steer type in which a rigid axle pivots about a central vertical axis for steering.

In the construction of the present invention, a rigid drive axle for a land vehicle is mounted from the vehicle frame by a four-bar linkage which mounts the axle for vertical pivotal movement about its center while permitting roll and jounce of the axle relative to the frame. The springing consists of a pair of vertical coil springs extending between the frame and axle, the springs being capable of lateral deflection to permit steering of the axle about of vertical pivot.

Among the objects of the present invention are to provide a rigid vehicle axle of the "wagon steer" type in which the axle is supported from the frame by a linkage defining the turning axis and at the same time providing for roll, jounce and rebound, to provide such an axle in which the springs for supporting the axle from the frame do not interfere with steering or axle movement and generally to improve axle suspensions f the type described.

Other objects and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

Figure 1:
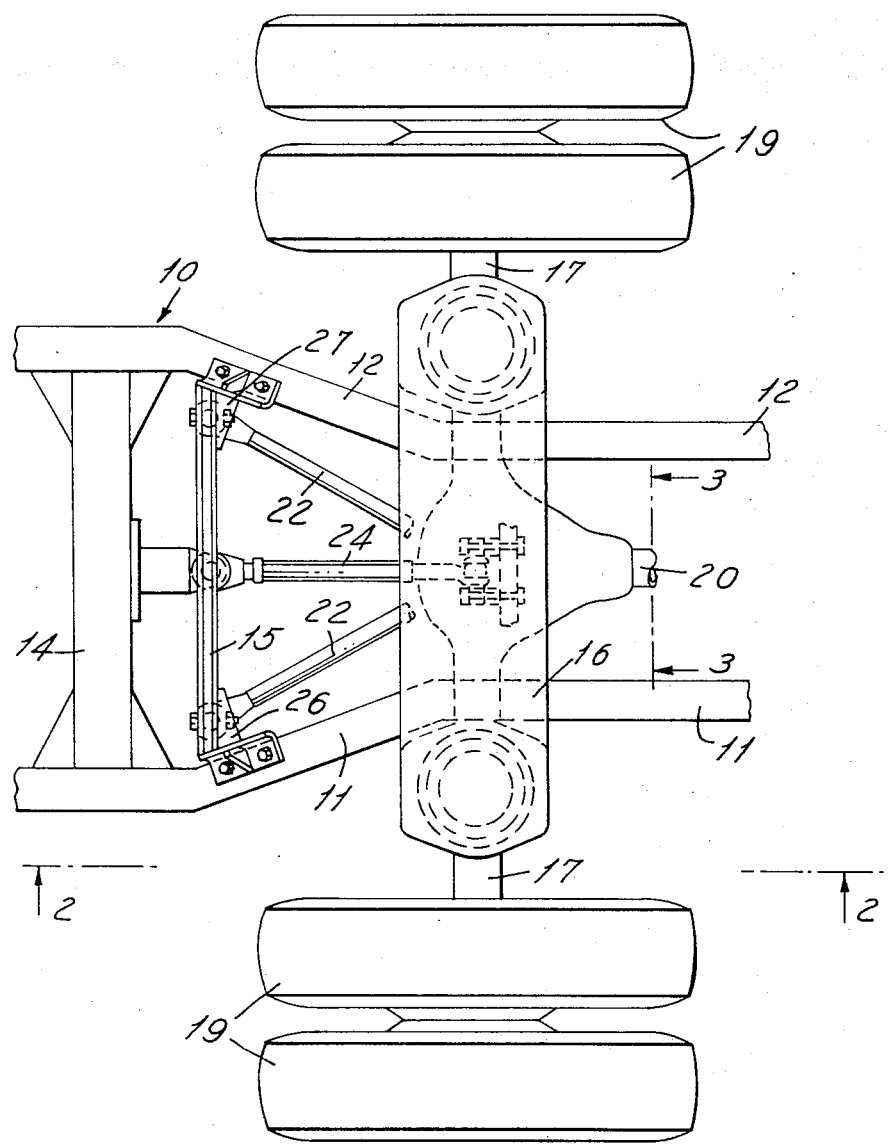
FIG. 1 is a top plan view of a vehicle chassis having an axle suspension according to the present invention, only a portion of the chassis being shown.
Figure 2:
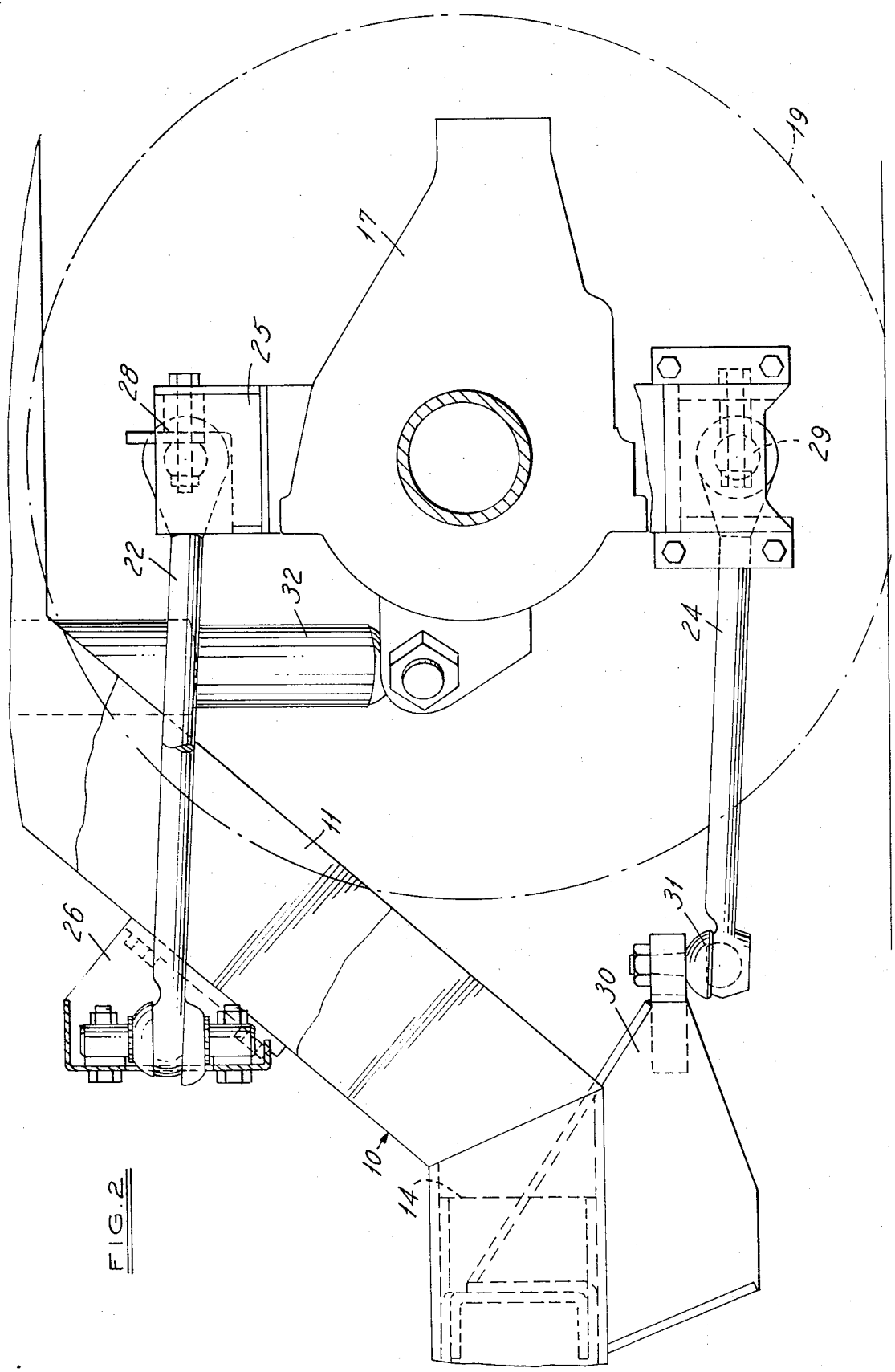
FIG. 2 is a side elevation of the suspension linkage and associated parts, a portion of the frame being broken away and the axle being shown in vertical section along the line 2—2 of FIG. 1.

Referring to the drawings, the frame 10 includes a pair of generally parallel side members 11 and 12 which are connected by a plurality of cross members, including members 14, 15 and 16. As shown in FIG. 2, the side members 11 and 12 kick up above the vehicle axle 17 for additional clearance.

The vehicle driving axle 17, which is of the rigid type, extends transversely beneath the frame side members 11 and 12 and supports the vehicle wheels 19. The axle is driven by a longitudinally extending driveshaft 20. Preferably, the axle is reinforced by a frame 25 extending for the length of the axle. The construction as thus far described is more or less conventional.

The suspension system includes a pair of coil springs 21 extending between the top of the axle-reinforcing frame 25 and the ends of the cross member 16. The axle 17 is supported from the frame 10 by a four-bar linkage type of suspension including a V-shaped upper link 22 and a single lower link 24. The apex of the upper link 22 is secured to the frame 25 above the axle 17 by a ball joint connection 28 to permit limited universal movement of the upper link relative to the axle. The opposite ends of the upper link 22 are secured by ball joints to mounting pads 26 and 27 secured to the side members 11 and 12 of the frame.

The lower link 24 has one end secured to the reinforcing frame 25 below the axle 17 by a ball joint 29 permitting limited universal movement of the link. The opposite end of lower link 24 is secured to a mounting pad 30 located on the cross member 14 midway between the side members 11 and 12 by a ball joint 31. A pair of shock absorbers 32 may be connected between the axle 17 and the frame members 11 and 12 to control the spring action.

Figure 3:
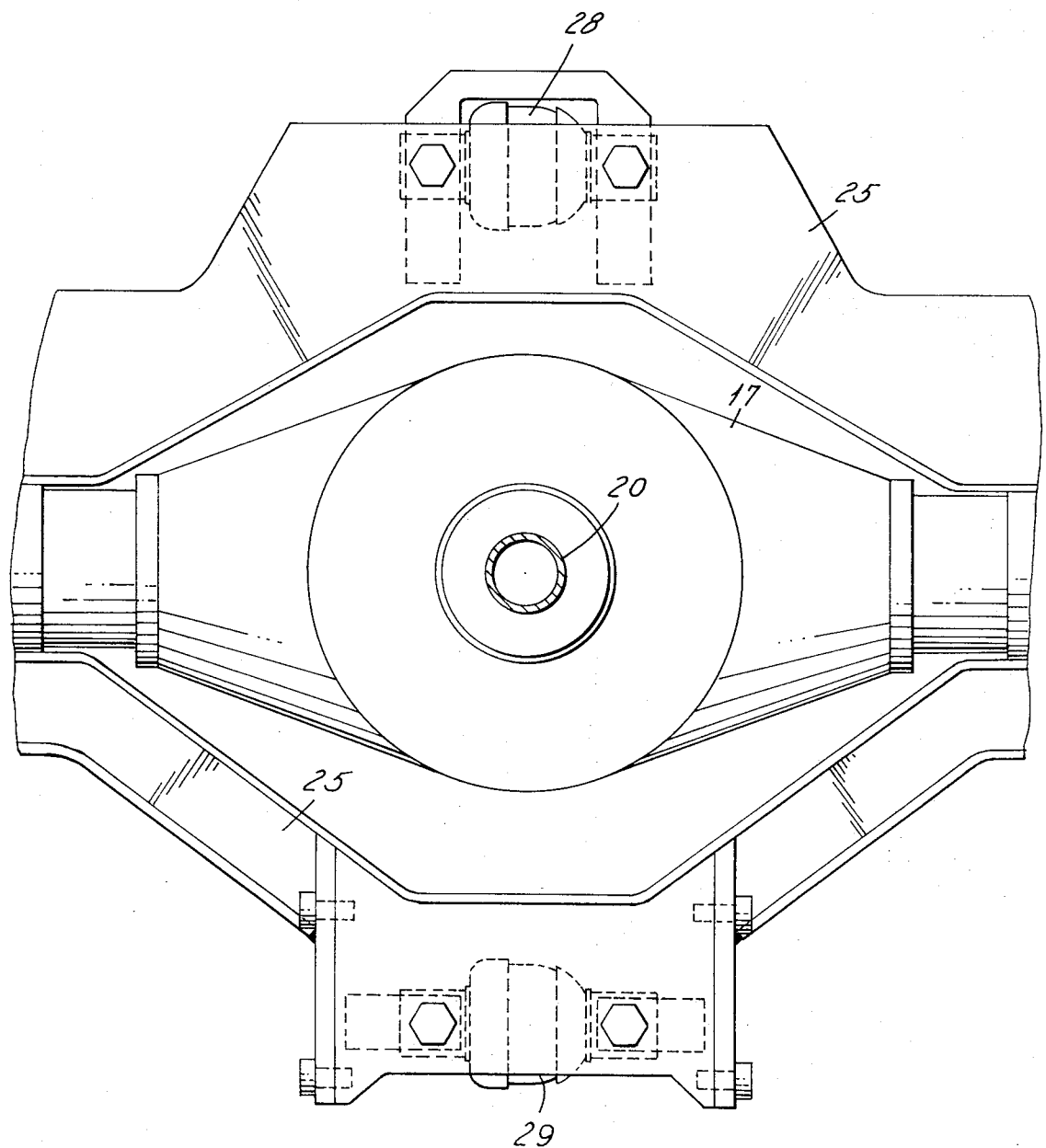
FIG. 3 is an elevation of the axle and associated suspension parts, the driveshaft being shown in vertical section along the line 3—3 of FIG. 1.

Referring to FIG. 3, it will be noted that the ball joints 28 and 29 lie on a vertical line or axis extending through the center of the rear axle. Referring to the drawings, it also will be noted that the axis or line through these ball joints extends through the transverse center line of the rear axle 17.

Thus, the ball joints 28 and 29 establish a central vertical axis about which the axle 17 may be rotated for steering the vehicle. In steering, the lower ends of the coil springs 21 will move with the axle while the upper ends of these springs remain fixed to the frame and cross member 16. These springs 21 are capable of sufficient deflection to permit such steering movement of the axle. Moreover, the lateral deflection of the springs in such steering movement serves to bias the axle towards straight ahead position.

The geometry of the linkage above described is such that the steering axis of the axle 17 established by the ball joints 28 and 29 remains substantially vertical at all times. Thus, the suspension provides not only for jounce and roll but also for wagon-type of steering of the axle. Further, the V-shaped upper link 22 communicates lateral forces of the frame 10 to the axle 17 and thus to the wheels. The linkage also transmits driving torque reaction of the axle to the frame 10.

The mechanism for steering the axle about the axis established by the ball joints 28 and 29 may be of the type disclosed in Colovas, et al U.S. Pat. application Ser. No. 186,212, filed Oct. 4, 1971.

We claim:

1. In a land vehicle, a generally rectangular vehicle frame, a rigid axle and means supporting the axle from the frame, said means comprising a V-shaped torque arm having its two free ends mounted on the frame for limited rotation on a common axis extending transversely of the frame and having its apex mounted for limited universal movement midway of the length of the axle, a second torque arm extending longitudinally of the frame, having one end mounted to the axle at a point opposite the mounting of the first torque arm and having its other arm mounted on the frame midway between its sides, both ends of said second torque arm being capable of limited universal movement, and spring means extending between the axle and frame to transmit load from the frame to the axle.

2. In a land vehicle as claimed in claim 1, the V-shaped torque arm being attached to the top of the axle and the second torque arm being attached to the underside thereof.

3. In a land vehicle as claimed in claim 2, the spring means comprising a pair of vertically extending coil springs, one spring extending between eacn end portion of the axle and the frame, the springs being capable of deflection to permit steering of the axle about the axis established by the mounting points of the torque arms thereon.

4. In a land vehicle as claimed in claim 1, the vehicle frame comprising a pair of spaced longitudinal members connected at intervals by transverse members, the V-shaped torque arm spanning between the frame longitudinal members and the second torque arm being mounted to a transverse member midway between the longitudinal members.

* * * * *